(12) United States Patent
Fabre et al.

(10) Patent No.: US 9,624,790 B2
(45) Date of Patent: Apr. 18, 2017

(54) FAN COWL LOCKING SYSTEM

(71) Applicant: Airbus Operations (SAS), Toulouse (FR)

(72) Inventors: Christian Fabre, Tournefeuille (FR); Alain Bignolais, Leguevin (FR)

(73) Assignee: Airbus Operations SAS, Toulouse (FR)

(*) Notice: Subject to any disclaimer, the term of this patent is extended or adjusted under 35 U.S.C. 154(b) by 190 days.

(21) Appl. No.: 14/575,363

(22) Filed: Dec. 18, 2014

(65) Prior Publication Data

US 2015/0184543 A1 Jul. 2, 2015

Related U.S. Application Data

(60) Provisional application No. 61/922,968, filed on Jan. 2, 2014.

(30) Foreign Application Priority Data

Jan. 2, 2014 (FR) ...................................... 14 50001

(51) Int. Cl.
| | |
|---|---|
| *B64D 29/06* | (2006.01) |
| *F01D 25/24* | (2006.01) |
| *E05C 19/14* | (2006.01) |
| *E05B 11/02* | (2006.01) |

(52) U.S. Cl.
CPC ............ *F01D 25/24* (2013.01); *B64D 29/06* (2013.01); *E05B 11/02* (2013.01); *E05C 19/145* (2013.01); *Y10T 70/7486* (2015.04)

(58) Field of Classification Search
CPC ......... B64D 29/06; F01D 25/24; E05B 11/02; E05C 3/045; E05C 19/12
See application file for complete search history.

(56) References Cited

U.S. PATENT DOCUMENTS

| | | | |
|---|---|---|---|
| 3,070,395 A | | 12/1962 | Morrison et al. |
| 4,531,769 A | * | 7/1985 | Glancy ................... E05C 19/14 |
| | | | 292/113 |

(Continued)

FOREIGN PATENT DOCUMENTS

| | | |
|---|---|---|
| FR | 2832752 | 5/2003 |
| FR | 2852049 | 9/2004 |

OTHER PUBLICATIONS

French Search Report, Aug. 26, 2014.

*Primary Examiner* — Christopher P Ellis
*Assistant Examiner* — Michael Wang
(74) *Attorney, Agent, or Firm* — Greer, Burns & Crain, Ltd.

(57) ABSTRACT

A locking system comprising a handle mounted such that it can rotate about an operating spindle, wherein the handle can move between a locked position and an unlocked position, a hook mounted on the handle and secured in rotation therewith, wherein the hook has a throat in which a latching point of a structure is designed to engage when the handle is in the locked position. The locking system comprises a key associated with the hook and by means of which it is possible to pass from the locked position to the unlocked position of the handle, wherein the key can be removed when the handle is in the locked position and cannot be removed when the handle is in the unlocked position.

16 Claims, 5 Drawing Sheets

(56) References Cited

U.S. PATENT DOCUMENTS

| | | | | |
|---|---|---|---|---|
| 4,598,940 A * | 7/1986 | DeGroat | ................ | E05C 3/045 |
| | | | | 16/230 |
| 4,877,274 A * | 10/1989 | Poe | .................... | E05B 15/0006 |
| | | | | 292/108 |
| 5,927,765 A * | 7/1999 | Austin | ................ | E05B 63/0065 |
| | | | | 292/194 |
| 6,036,238 A * | 3/2000 | Lallament | .............. | B64D 29/06 |
| | | | | 292/100 |
| 6,343,815 B1 * | 2/2002 | Poe | ...................... | E05C 19/145 |
| | | | | 292/113 |
| 6,513,357 B2 * | 2/2003 | McCurry | ................ | E05B 11/00 |
| | | | | 70/389 |
| 7,066,500 B2 * | 6/2006 | Haber | ................ | E05B 17/2038 |
| | | | | 292/106 |
| 7,204,458 B2 * | 4/2007 | Porte | .................... | B64D 29/06 |
| | | | | 244/129.4 |
| 7,461,871 B2 * | 12/2008 | Vauchel | ................ | E05C 19/145 |
| | | | | 292/113 |
| 8,714,602 B2 * | 5/2014 | Rowbut | ............. | E05B 17/0033 |
| | | | | 292/95 |
| 8,864,189 B2 * | 10/2014 | Fournie | ................ | E05C 19/145 |
| | | | | 292/256.69 |
| 8,925,979 B2 * | 1/2015 | Hernandez | ............ | E05B 63/143 |
| | | | | 292/113 |
| 9,004,548 B2 * | 4/2015 | Joret | .................... | B64D 29/06 |
| | | | | 292/96 |
| 2004/0104583 A1 * | 6/2004 | Porte | .................... | B64D 29/06 |
| | | | | 292/229 |
| 2006/0214431 A1 | 9/2006 | Helsley | | |

* cited by examiner

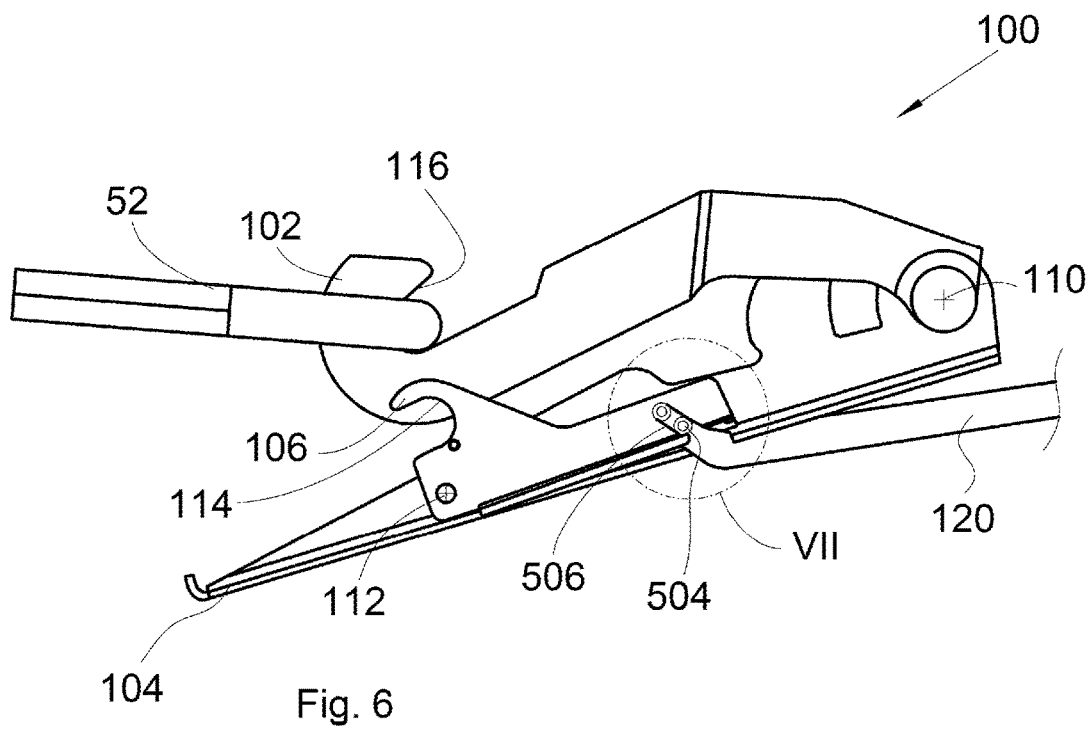
Fig. 6
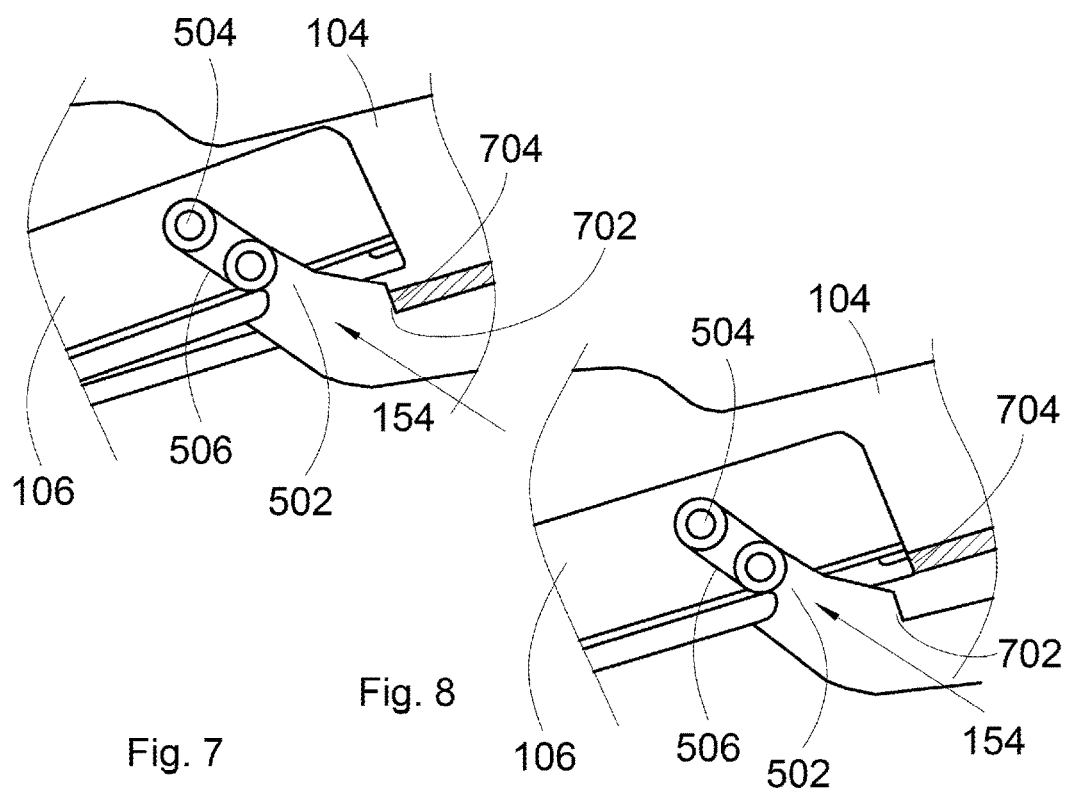
Fig. 7
Fig. 8

FAN COWL LOCKING SYSTEM

CROSS-REFERENCES TO RELATED APPLICATIONS

This application claims the benefit of the French patent application No. 1450001 filed on Jan. 2, 2014, and the U.S. Provisional Patent Application Ser. No. 61/922,968, filed Jan. 2, 2014, the entire disclosures of which are incorporated herein by way of reference.

BACKGROUND OF THE INVENTION

The present invention relates to a system for locking fan cowls of an aircraft nacelle, to an aircraft nacelle comprising such a locking system, and to an aircraft comprising such a nacelle.

An aircraft comprises at least one nacelle which houses an engine, for example of the jet engine type, and which is suspended from a pylon. The nacelle generally comprises two fan cowls which may be opened so as to be able to carry out maintenance on the engine.

Each fan cowl is articulated about an opening axis parallel to the longitudinal axis of the nacelle and arranged in the upper part of the fan cowls, and the two fan cowls are arranged symmetrically on either side of the pylon.

Each fan cowl can thus move between a closed position, in which the fan cowl is arranged in the extension of the outer surface of the nacelle so as to cover the casing of the fan, and an open position, in which an operator has access to the engine.

The lower edges of the fan cowls, which are located in the lower part of the nacelle, are substantially contiguous in the closed position and are held in this locked position by multiple locking systems which are distributed along the contiguous lower edges of the fan cowls.

FIG. 1 shows a section through a locking system 50 of the prior art, between a first fan cowl 10 and a second fan cowl 20. The first fan cowl 10 bears a latching point 52, also called a "keeper", which is attached at the lower edge of the first fan cowl 10. The locking system 50 also comprises a hook 54 and a handle 58 which are mounted such that they can rotate with respect to one another about a rotation spindle 56.

The handle 58 and the hook 54 are mounted together and able to rotate, at the lower edge of the second fan cowl 20 via the intermediary of an articulation 62, about the rotation spindle 56. The articulation 62 consists of two articulated rods which are mounted so as to be able to rotate with respect to one another, and of which one is mounted so as to be able to rotate on the second fan cowl 20, the other bearing the handle 58/hook 54 assembly.

In the engaged position, the hook 54 receives the latching point 52 and the locking system 50 is locked when the handle is folded down between the fan cowls 10 and 20.

Before takeoff, an operator must check that the locking system 50 is properly engaged and locked. The fan cowls 10 and 20 tend to move toward one another under their own weight, and an operator may incorrectly assume, after a visual check, that the locking system is engaged and locked.

SUMMARY OF THE INVENTION

It is an object of the present invention to provide a locking system which does not have the drawbacks of the prior art and which in particular allows an operator to ensure, visually, that the locking system is indeed locked.

To that end, disclosed here is a locking system comprising:
a handle which is mounted such that it can rotate about an operating spindle, wherein the handle can move between a locked position and an unlocked position,
a hook which is mounted on the handle and secured in rotation therewith, wherein the hook has a throat in which a latching point of a structure is designed to engage when the handle is in the locked position,
wherein the locking system comprises a key which is associated with the hook and by means of which it is possible to pass from the locked position to the unlocked position of the handle, wherein the key can be removed when the handle is in the locked position and cannot be removed when the handle is in the unlocked position.

Such a locking system makes it possible to prevent the key from being withdrawn while locking is incomplete and an operator can thus easily see that the locking system is not correctly locked as the key remains visible at the lower part of the nacelle.

BRIEF DESCRIPTION OF THE DRAWINGS

The abovementioned features of the invention, as well as others, will emerge more clearly upon reading the following description of an exemplary embodiment, said description being given in relation to the appended drawings, in which:

FIG. 6 shows the locking system in the engaged and unlocked position and in the blocking position, FIG. 7 shows an enlarged view of the detail VII of FIG. 6 in the blocking position, and FIG. 8 shows the same detail as that of FIG. 7 when the locking system is in the engaged and locked position.

DETAILED DESCRIPTION OF THE PREFERRED EMBODIMENTS

The invention is more particularly described in the context of a locking system for fan cowls of an aircraft nacelle attached beneath a pylon of said aircraft. As in the prior art, the fan cowls are mounted such that they can rotate about an opening axis which is parallel to the axis of the nacelle, and on either side of the pylon.

Figure 1:
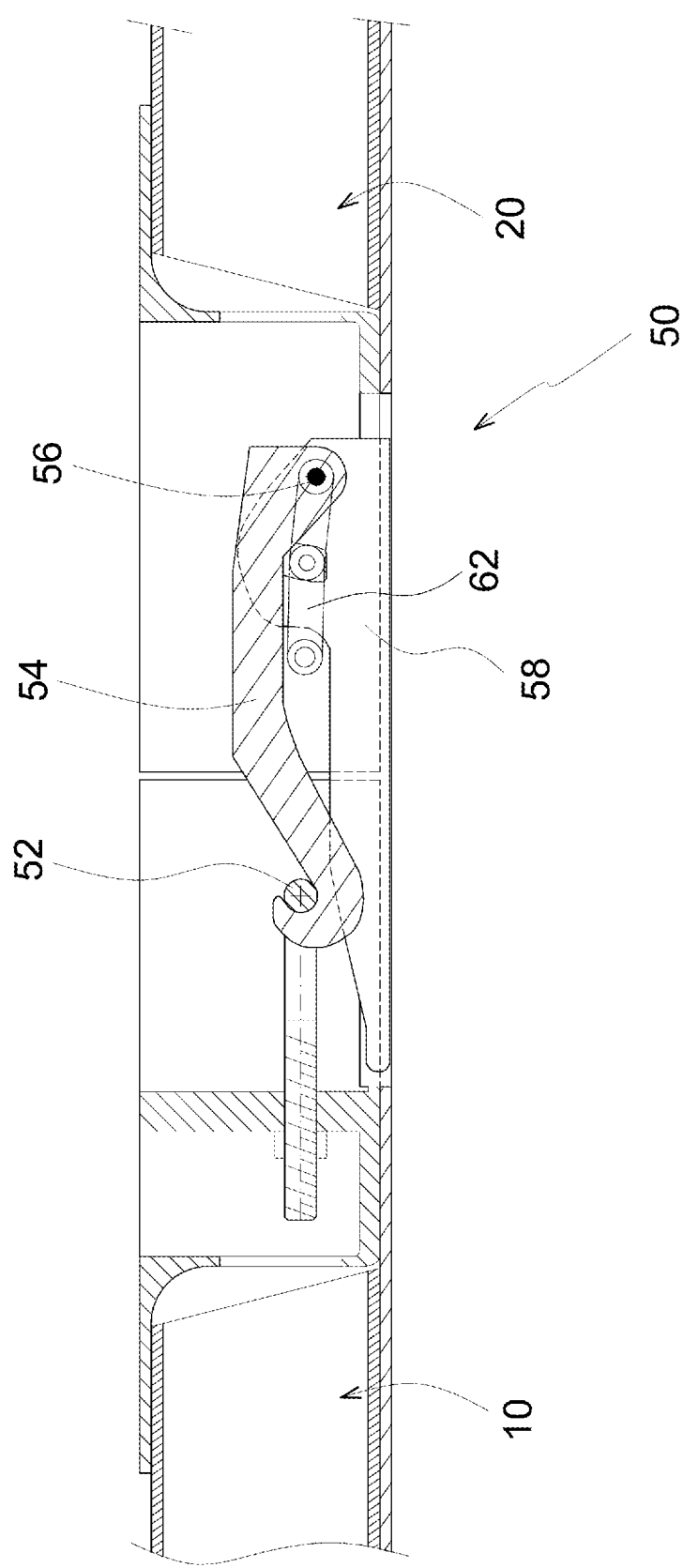
FIG. 1 is a schematic representation in section of a locking system of the prior art.
Figure 2:
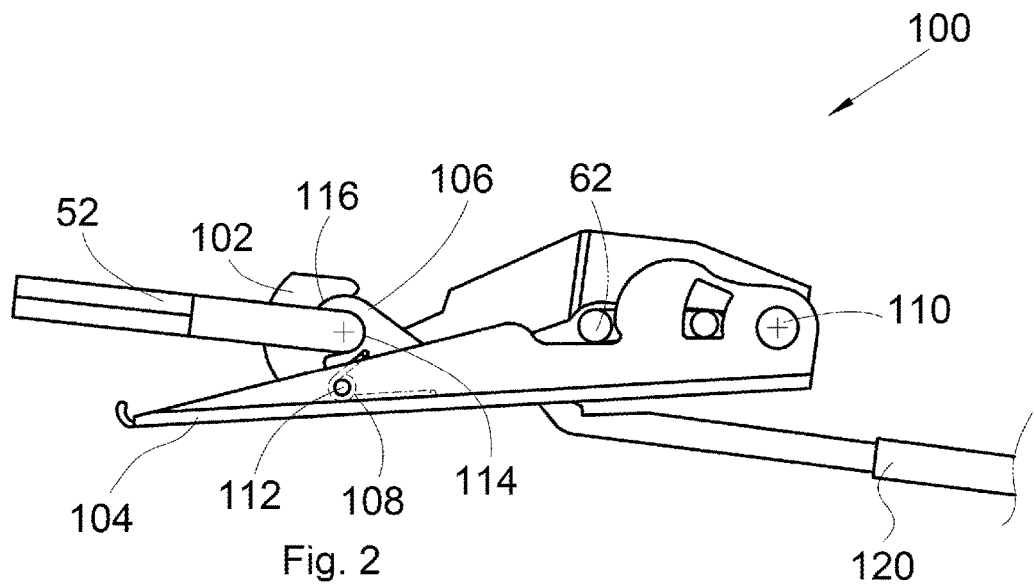
FIG. 2 shows the locking system according to the invention in the engaged and locked position.

FIG. 2 shows a locking system 100 which is designed to lock two structures, in particular the lower edges of the two fan cowls, the first of which has a latching point 52.

The lower edge of the second fan cowl has an articulation 62 which in this case comprises two articulated rods which are able to rotate with respect to one another, and of which the first is mounted so as to be able to rotate on the lower edge of the second fan cowl, the second bearing the locking system 100.

The locking system 100 comprises a hook 102 and a handle 104.

The hook 102 is mounted on the handle 104 and secured in rotation therewith about an operating spindle 110 parallel with the opening axis and, as in the prior art, the handle 104 is mounted on the second articulated rod of the articulation 62 such that it can rotate about the operating spindle 110.

The hook 102 has a throat 116 in which, in the engaged position, the latching point 52 engages, which corresponds to a locked position of the handle 104.

The handle 104 can thus move between the locked position which locks the two fan cowls to one another and in which the latching point 52 is engaged in the hook 102, and an unlocked position in which the two fan cowls are de-secured and in which the latching point 52 is not engaged in the hook 102.

The locking system 100 comprises a key 120 which is associated with the hook 102 and by means of which it is possible to pass from the locked position to the unlocked position of the handle 104, wherein the key 120 can be removed when the handle 104 is in the locked position and cannot be removed when the handle 104 is in the unlocked position.

"Associated" means that the hook 102 can move only if the key 120 is present and an operator acts on the key 120.

"Can be removed" means that the key 120 can be withdrawn only by the action of an operator and "cannot be removed" means that the key 120 cannot be withdrawn, even by an operator.

Thus, while the locking system 100 is not engaged and locked, the key 120 remains visible to the operator.

Here, the locking system 100 comprises a counter-hook 106 which is mounted on the handle 104 and secured in rotation therewith about a disengagement spindle 112 parallel with and remote from the operating spindle 110, and which is in this case arranged opposite the operating axis 110 and substantially vertically in relation to the latching point 52.

The counter-hook 106 has a counter-throat 114 which, in the locked position, is placed facing the throat 116, and in which the latching point 52 engages. The latching point 52 is thus sandwiched between the throat 116 and the counter-throat 114, and the handle 104 is then in the locked position.

The locking system 100 has an engaged and locked position in which the hook 102 and the counter-hook 106 grip the latching point 52 and in which the handle 104 cannot be operated since the counter-hook 106 secures the handle 104 on the latching point 52.

Figure 3:
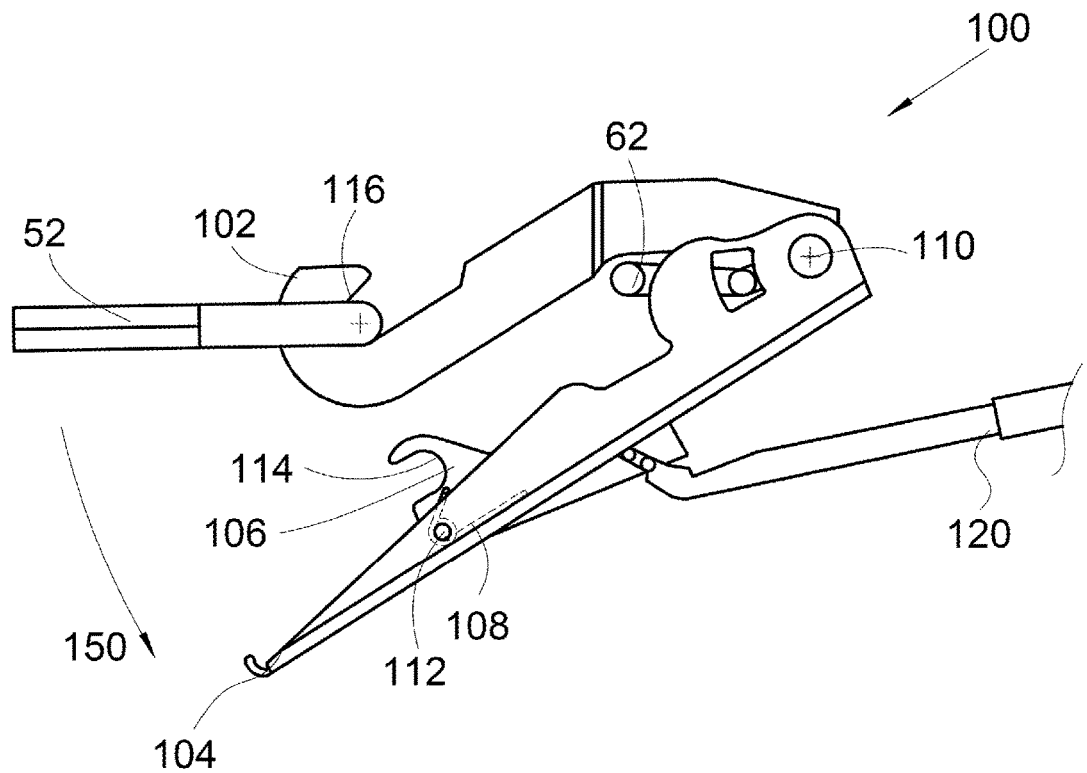
FIG. 3 shows the locking system according to the invention in the engaged and unlocked position.

FIG. 3 shows the locking system in an engaged and unlocked position in which the hook 102 receives the latching point 52 but in which the counter-hook 106 is remote from the latching point 52 and in which the handle 104 can be operated.

The locking system 100 also has a disengaged position in which the latching point 52 is received neither in the hook 102 nor in the counter-hook 106, and in which the two fan cowls can be opened.

In FIG. 3, the counter-hook 106 is in a free position in which the counter-throat 114 is remote from the latching point 52 (corresponding to the unlocked position), allowing the handle 104 to rotate from the locked position to the unlocked position.

In FIG. 2, the counter-hook 106 is in a gripping position in which the latching point 52 is sandwiched between the counter-throat 114 and the throat 116 (corresponding to the locked position). The gripping position corresponds to the fact that the counter-hook 106 bears against the latching point 52.

In FIG. 6, the counter-hook 106 is in a blocking position which is distinct from the free position and from the gripping position.

The key 120 is designed to engage with the counter-hook 106 so as to maneuver it from one position to another.

The locking system 100 comprises blocking means which are designed to prevent the key 120 from being withdrawn when the counter-hook 106 is in the blocking position, and to allow the key 120 to be withdrawn when the counter-hook 106 is in the gripping position.

In order to increase visibility for the operator, a pennant 160 (FIG. 4) may be attached to the key 120.

The blocking position is beyond the gripping position, with respect to the free position.

The locking system 100 comprises a spring 108 which is designed to force the counter-hook 106 into the blocking position. Here, the spring 108 takes the form of a torsion spring which is fitted onto the spindle 112 and bears against the handle 104 and the counter-hook 106.

Figure 5:
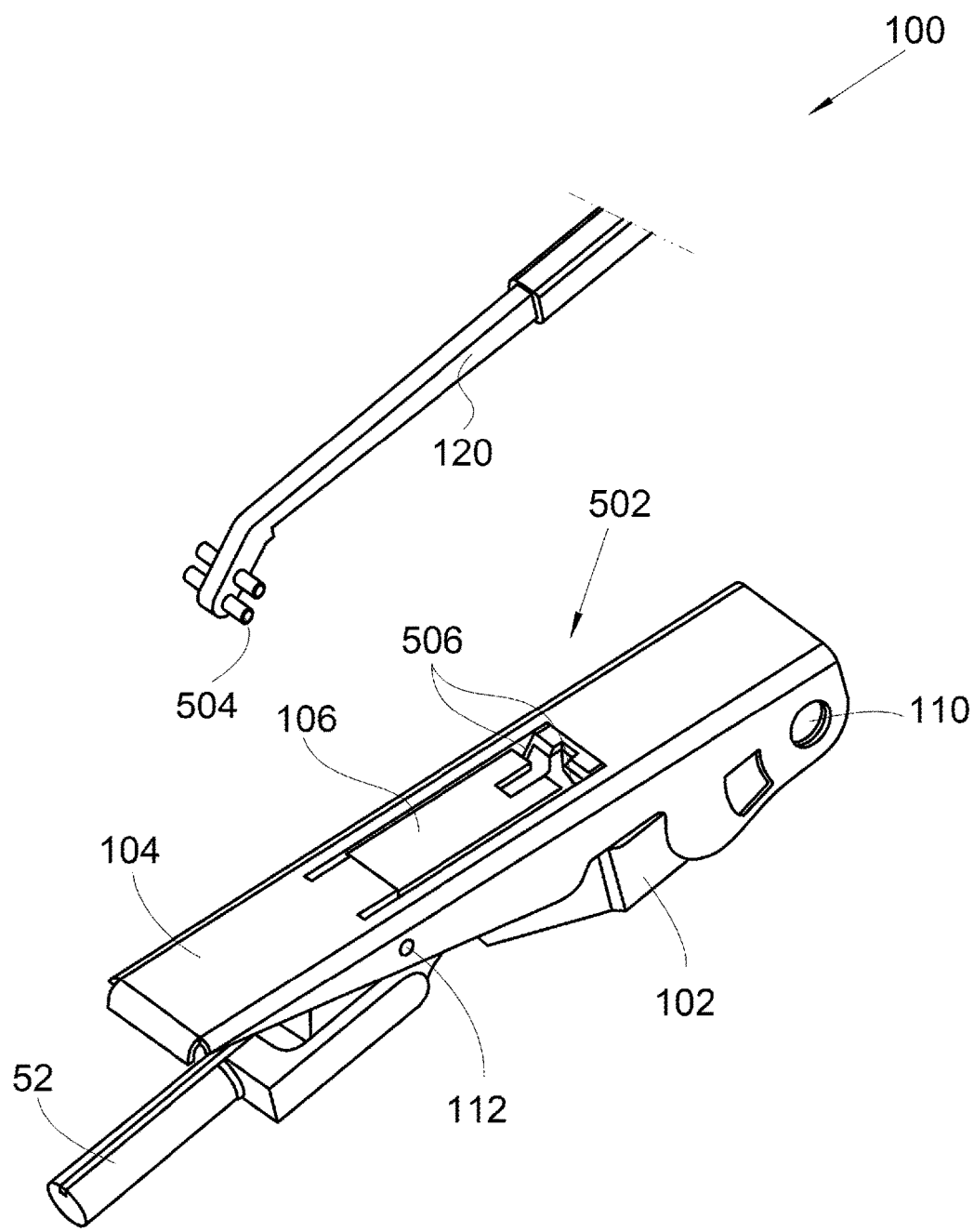
FIG. 5 shows another view of the locking system.

FIG. 5 shows the face of the locking system 100 by means of which the key 120 is introduced into the counter-hook 106 in an introduction direction 154. To that end, the counter-hook 106 has two slots 506 which face each other, are parallel to the introduction direction 154 and open at an opening 502 into which the key 120 is introduced in order to maneuver the counter-hook 106. The shape of the key 120 is of a suitable shape such that it is possible to maneuver the counter-hook 106 in rotation.

Here, the key 120 has, for each slot 506, two male shapes 504 which are introduced into said slot 506.

Starting from the engaged and locked position, the operator introduces the key 120 into the counter-hook 106 in the introduction direction 154, and makes it pivot from the gripping position (FIG. 2) to the free position (FIG. 3), which unlocks the handle 104 which is no longer secured to the latching point 52. When the key 120 is released, the spring 108 returns the counter-hook 106 which then passes, without stopping, via the gripping position and continues to the blocking position (FIG. 6).

The handle 104 may then be rotated about the operating spindle 110, as indicated by the arrow 150 of FIG. 3. The latching point 52 may then be disengaged from the hook 102 as in the case of the prior art.

Figure 4:
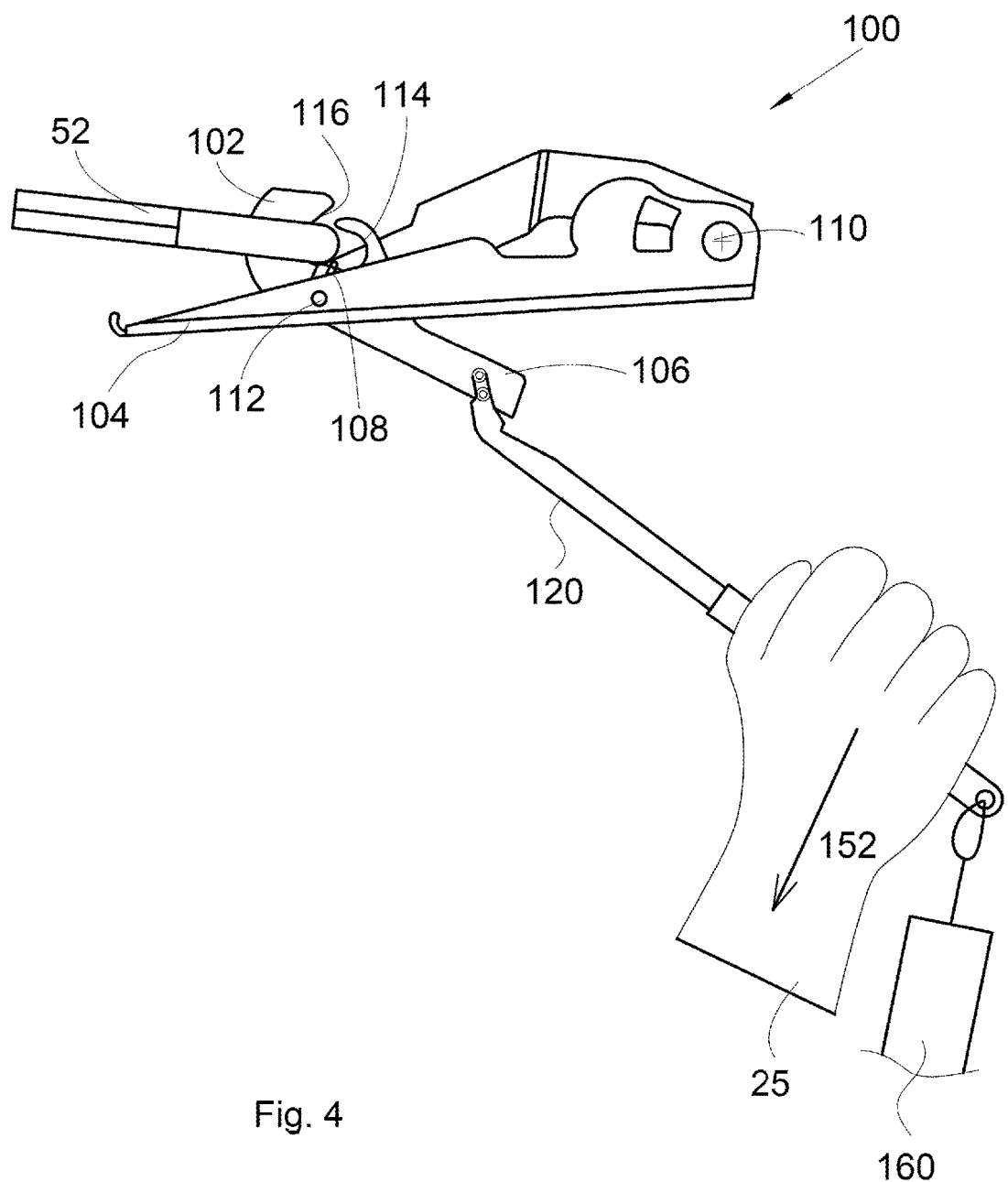
FIG. 4 shows an operator unlocking the locking system.

FIG. 4 shows the locking system 100 when an operator 25 rotates (arrow 152) the key 120 so as to pivot the counter-hook 106 which passes from the gripping position to the free position.

FIG. 6 shows the locking system 100 in the engaged and unlocked position, when the operator is no longer exerting a force on the key 120, that is to say when the counter-hook 106 has passed into the blocking position under the action of the spring 108.

FIG. 7 is an enlarged view of the detail VII of FIG. 6, when the counter-hook 106 is in the blocking position.

FIG. 8 is an enlarged view of the detail VII of FIG. 6 in the engaged and locked position, that is to say when the counter-hook 106 bears against the latching point 52 and has therefore pivoted from the blocking position and has returned to the gripping position.

In the gripping position and in the introduction direction 154, the opening 502 is free and not obstructed.

In the blocking position and in the introduction direction 154, the opening 502 opens at a part 704 of the handle 104 which at least partly obstructs said opening 502 in the extension of the slots 506.

The key 120 has a notch 702.

FIG. 7 shows the locking system 100 when the counter-hook 106 is in the blocking position in which said part 704 which obstructs the opening 502 is received in the notch 702. It is thus impossible to withdraw the key 120.

FIG. 8 shows the locking system 100 when the counter-hook 106 is in the gripping position. The rotation from the blocking position to the gripping position causes the notch 702 to move away from said part 704 and the key 120 is then free to be introduced or withdrawn from the slots 506.

Starting from the disengaged position, the operator places the hook 102 around the latching point 52, which places the locking system 100 in the engaged and unlocked position.

The operator then rotates the counter-hook 106 by means of the key 120, causing the counter-hook 106 to pivot from the blocking position to the free position, then the operator places the counter-hook 106 against the latching point 52.

The operator then releases the key 120 and, under the action of the spring 108, the counter-hook 106 pivots toward the blocking position but is stopped in the gripping position by the latching point 52. The locking system 100 is then in the engaged and locked position.

The key 120 is then free and may be withdrawn from the counter-hook 106.

The blocking means then consist of the part 704 which is positioned so as to partly obstruct the opening 502 in the blocking position, and so as to not obstruct the opening 502 in the gripping position, and of the notch 702 which abuts against the part 704 in the blocking position.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A locking system comprising:
   a handle mounted such that it is rotatable about an operating spindle, wherein the handle can move between a locked position and an unlocked position,
   a hook mounted on the handle and secured in rotation therewith, wherein the hook has a throat in which a latching point of a structure is designed to engage when the handle is in the locked position,
   a key associated with the hook and by means of which it is possible to pass from the locked position to the unlocked position of the handle, wherein the key can be removed when the handle is in the locked position and cannot be removed when the handle is in the unlocked position,
   a counter-hook having a counter-throat in which said latching point is designed to engage when the handle is in the locked position, and which is mounted on the handle such that it is secured in rotation therewith, wherein the key is arranged so as to engage with the counter-hook, and wherein the counter-hook is arranged so as to adopt, alternatively, under the action of the key, a free position in which the counter-throat is remote from the latching point allowing the handle to rotate from the locked position to the unlocked position, a gripping position in which the latching point is sandwiched between the counter-throat and the throat, and a position, called the blocking position, which is distinct from the gripping position, and,
   a blocking arrangement provided so as to prevent the key from being removed when the counter-hook is in the blocking position, and to allow the key to be removed when the counter-hook is in the gripping position.

2. The locking system as claimed in claim 1, further comprising a pennant attached to the key.

3. The locking system as claimed in claim 1, wherein the blocking position is beyond the gripping position with respect to the free position, and wherein the locking system further comprises a spring which bears between the handle and the counter-hook in order to force the counter-hook into the blocking position.

4. The locking system as claimed in claim 1, wherein the counter-hook has two slots which open at an opening into which the key may be introduced, wherein the key has shapes configured to be introduced into the slots, wherein the blocking arrangement is formed by a part of the handle which is arranged so as to partly obstruct the opening in the blocking position, and so as to not obstruct the opening in the gripping position, and by a notch of the key which abuts against the part in the blocking position.

5. The locking system as claimed in claim 1 further comprising:
   a spring configured to force the counter-hook into the blocking position.

6. An aircraft nacelle comprising:
   two fan cowls mounted such that they can rotate about an opening axis parallel to an axis of the nacelle, of which a first fan cowl has a latching point, and
   a locking system comprising:
      a handle mounted such that it is rotatable about an operating spindle, wherein the handle can move between a locked position and an unlocked position,
      a hook mounted on the handle and secured in rotation therewith, wherein the hook has a throat in which a latching point of a structure is designed to engage when the handle is in the locked position,
      a key associated with the hook and by means of which it is possible to pass from the locked position to the unlocked position of the handle,
      a counter-hook mounted on the handle and moveable under the action of the key between at least a free position in which the counter-hook is remote from the latching point allowing the handle to rotate from the locked position to the unlocked position, a gripping position in which the latching point is sandwiched between the counter-hook and the throat, and a position, called the blocking position, which is distinct from the gripping position,
      wherein the key can be removed only when the handle is in the locked position and the counter-hook is in the gripping position and cannot be removed when the handle is in the unlocked position,
      the handle being mounted such that it is rotatable on the second fan cowl about an operating spindle which is parallel to the opening axis.

7. The aircraft nacelle as claimed in claim 6, further comprising a pennant attached to the key.

8. The aircraft nacelle as claimed in claim 6, wherein the blocking position is beyond the gripping position with respect to the free position, and wherein the locking system further comprises a spring which bears between the handle and the counter-hook in order to force the counter-hook into the blocking position.

9. The aircraft nacelle as claimed in claim 6, wherein the counter-hook comprises a counter-throat in which said latching point is designed to engage when the handle is in the locked position, and which is mounted on the handle such that it is secured in rotation therewith, and
   wherein the locking system further comprises a blocking arrangement provided so as to prevent the key from being removed when the counter-hook is in the blocking position, and to allow the key to be removed when the counter-hook is in the gripping position.

10. The aircraft nacelle as claimed in claim 9, wherein the counter-hook has two slots which open at an opening into which the key may be introduced, wherein the key has shapes configured to be introduced into the slots, wherein the blocking arrangement is formed by a part of the handle which is arranged so as to partly obstruct the opening in the blocking position, and so as to not obstruct the opening in the gripping position, and by a notch of the key which abuts against the part in the blocking position.

11. A locking system comprising:
   a handle mounted such that it is rotatable about an operating spindle, wherein the handle can move between a locked position and an unlocked position,
   a hook mounted on the handle and secured in rotation therewith, wherein the hook has a throat in which a latching point of a structure is designed to engage when the handle is in the locked position,
   a counter-hook configured to engage the latching point and being mounted on the handle and moveable between a free position in which the counter-hook s remote from the latching point allowing the handle to rotate from the locked position to the unlocked position, a gripping position in which the latching point is sandwiched between the counter-hook and the throat, and a position, called the blocking position, which is distinct from the gripping position
   a key associated with the hook and arranged so as to engage with the counter-hook, and wherein under the action of the key, the handle passes from the locked position to the unlocked position and the counter-hook passes from the gripping position to the blocking position or the gripping position, and,
   wherein the key can only be removed when the handle is in the locked position and the counter-hook is in the gripping position and cannot be removed when the handle is in the unlocked position.

12. The locking system as claimed in claim 11, further comprising a pennant attached to the key.

13. The locking system as claimed in claim 11, wherein the blocking position is beyond the gripping position with respect to the free position.

14. The locking system as claimed in claim 11 further comprising:
   a blocking arrangement provided so as to prevent the key from being removed when the counter-hook is in the blocking position, and to allow the key to be removed when the counter-hook is in the gripping position.

15. The locking system as claimed in claim 14, wherein the counter-hook has two slots which open at an opening into which the key may be introduced, wherein the key has shapes configured to be introduced into the slots, wherein the blocking arrangement is formed by a part of the handle which is arranged so as to partly obstruct the opening in the blocking position, and so as to not obstruct the opening in the gripping position, and by a notch of the key which abuts against the part in the blocking position.

16. The locking system as claimed in claim 15 further comprising:
   a spring configured to force the counter-hook into the blocking position.

* * * * *